(12) United States Patent
Bindana et al.

(10) Patent No.: US 10,552,708 B2
(45) Date of Patent: Feb. 4, 2020

(54) METHOD AND SYSTEM FOR EXTRACTING IMPRESSION MARKS USING A MOBILE APPLICATION

(71) Applicant: Xerox Corporation, Norwalk, CT (US)

(72) Inventors: Srinivasarao Bindana, Andhra Pradesh (IN); Mahesh Ramasamy, Ariyalur (IN); Baskaran Sathishkannah, Pondicherry (IN); Liya Stanley, Kerala (IN)

(73) Assignee: Xerox Corporation, Norwalk, CT (US)

( * ) Notice: Subject to any disclaimer, the term of this patent is extended or adjusted under 35 U.S.C. 154(b) by 76 days.

(21) Appl. No.: 15/913,988

(22) Filed: Mar. 7, 2018

(65) Prior Publication Data

US 2019/0279027 A1    Sep. 12, 2019

(51) Int. Cl.
*G06K 9/00* (2006.01)
*G06K 9/62* (2006.01)

(52) U.S. Cl.
CPC ........ *G06K 9/6211* (2013.01); *G06K 9/00577* (2013.01); *G06K 9/6206* (2013.01)

(58) Field of Classification Search
None
See application file for complete search history.

(56) References Cited

U.S. PATENT DOCUMENTS

| | | | |
|---|---|---|---|
| 4,837,842 A * | 6/1989 | Holt | G06K 9/00 235/379 |
| 6,229,578 B1 | 5/2001 | Acharya et al. | |
| 6,769,470 B2 | 8/2004 | Tamai et al. | |
| 6,798,910 B1 | 9/2004 | Wilson | |
| 6,883,429 B2 | 4/2005 | Kamoda | |
| 7,136,082 B2 * | 11/2006 | Saund | G06K 9/00409 345/619 |
| 7,181,169 B2 | 2/2007 | Park | |
| 7,358,741 B2 | 4/2008 | Sato et al. | |
| 7,471,387 B1 | 12/2008 | Treado et al. | |
| 7,492,169 B2 | 2/2009 | Sato et al. | |
| 8,047,132 B2 | 11/2011 | Lu et al. | |

(Continued)

OTHER PUBLICATIONS

Leaver et al., "Chapter 11. Introduction to Forensic Document Examination," From: The Forensic Laboratory Handbook: Procedures and Practice Edited by: A. Mozayani and C. Noziglia © Humana Press Inc., Totowa, NJ (Year: 2011).*

(Continued)

*Primary Examiner* — Soo Shin
(74) *Attorney, Agent, or Firm* — Luis M. Ortiz; Kermit D. Lopez; Ortiz & Lopez, PLLC

(57) ABSTRACT

Methods and systems for extracting impression marks from a substrate (e.g., paper, foil, textile, etc.). In an example embodiment, an image of a substrate can be captured. Then, physical impressions on the substrate can be detected in the image. The physical impressions are scanned and highlighted a digital image configured, which is indicative of the actual physical impressions. The scanning and highlighting of the physical impressions can involve enhancing the image to digitally and electronically reproduce the physical impressions. This approach can be implemented in the context of a mobile scanning application that scans the physical impression(s) and highlights it, and saves the resulting image as an electronic document.

16 Claims, 11 Drawing Sheets

(56) References Cited

U.S. PATENT DOCUMENTS

| | | |
|---|---|---|
| 8,553,280 B2 | 10/2013 | Hoover et al. |
| 8,649,052 B2 | 2/2014 | Hoover et al. |
| 8,810,620 B2 | 8/2014 | Paoletti et al. |
| 8,922,612 B2 | 12/2014 | Paoletti et al. |
| 9,824,464 B2 | 11/2017 | Tremblay et al. |
| 2002/0116980 A1 | 8/2002 | Kerr et al. |
| 2008/0240601 A1 | 10/2008 | Adams, Jr. et al. |
| 2011/0169768 A1 | 7/2011 | Matsushima |
| 2013/0167665 A1 | 7/2013 | Niibori et al. |
| 2013/0322734 A1 | 12/2013 | Richter et al. |
| 2014/0084159 A1 | 3/2014 | Yaeshima et al. |
| 2014/0101540 A1* | 4/2014 | King .............. G06F 17/24 715/255 |
| 2016/0361945 A1 | 12/2016 | Mahajan |
| 2018/0020088 A1 | 1/2018 | Parmar et al. |
| 2018/0024361 A1 | 1/2018 | Erler et al. |

OTHER PUBLICATIONS

Lindblom, "Chapter 29. The Role of Indentation Analysis, Offsetting, and Transfer," From: Scientific Examination of Questioned Documents by Michael S. Bisesi, eBook published Apr. 27, 2006 (Year: 2006).*

Srihari et al., "Role of automation in the examination of handwritten items," PatternRecognition 47(2014): 1083-1095 (Year: 2014).*

Smith, "Chapter 2. Document Creation, Image Acquisition and Document Quality," From: D. Doermann, K. Tombre (eds.), Handbook of Document Image Processing and Recognition, DOI 10.1007/978-0-85729-859-1 3, © Springer-Verlag London 2014 Year: 2014).*

Mangasarian, O.L. et al., Privacy-Preserving Classification of Vertically Partitioned Data via Random Kernels, ACM Transactions on Knowledge Discovery from Data (2008) 2(3), 12 pages.

Cho, Y. H. et al., Optimization of Vertical and Horizontal Beamforming Kernels on the PowerPC G4 Processor with AltiVec Technology, IEEE Asilomar Conf. on Signals, Systems, and Computers (2000) 5 pages.

Centre of Forensic Sciences, Investigators & Submitters Technical Information Sheets, Dec. 6, 2007, 2 pages.

Urtasun, R., Computer Vision: Filtering, Jan. 10, 2013, TTI Chicago, 137 pages.

Brein, C., Model-Based Segmentation of Impression Marks, http://www.mrt.kit.edu/z/publ/download/sptm2005_brein.pdf, 7 pages.

* cited by examiner

182 → VERTICAL KERNEL (VK)

| 1 | 2 | 1 |
|---|---|---|
| 1 | 2 | 1 |
| 1 | 2 | 1 |

184 → HORIZONTAL KERNEL (HK)

| 1 | 1 | 1 |
|---|---|---|
| 2 | 2 | 2 |
| 1 | 1 | 1 |

*FIG. 8*

VERTICAL KERNEL (VK) - (3 x 3 MATRIX)

| LEFT | MIDDLE | RIGHT |
|------|--------|-------|
| X | X | X |
| X | X | X |
| X | X | X |

192 → HORIZONTAL KERNEL (HK) - (3 x 3 MATRIX)

| | | | |
|---|---|---|---|
| TOP | X | X | X |
| MIDDLE | X | X | X |
| BOTTOM | X | X | X |

196 → TEST

METHOD AND SYSTEM FOR EXTRACTING IMPRESSION MARKS USING A MOBILE APPLICATION

TECHNICAL FIELD

Embodiments are generally related to the field of image processing. Embodiments also relate to the field of scanning and mobile applications utilized by mobile devices such as smartphones, tablet computing devices, laptop computers, and so on. Embodiments also relate to methods and systems for extracting impression marks and other impression evidence from documents.

BACKGROUND

When writing is fashioned on a substrate such as a sheet of paper resting upon other pages or substrates, the indentations or impressions produced are typically transferred to those pages or substrates below. That is, when a person writes on a paper sitting atop other papers such as in the case of a notebook with many pages or a stack of sheets, an impression is typically left on the next page or sheet, which then possesses a colorless impression of the writing (e.g., text, numbers, sketches, etc.), which in some situations offers valuable information, particularly when the original document is lost or unavailable.

With naked eyes it is difficult to read the content of the substrate or paper having the usually colorless impression. Such impression evidence can include any markings produced when one object comes into contact with another, leaving behind some kind of indentation or print. Reading or discerning the impression is a very time consuming process and takes a great deal of time and effort from a user.

The ability to quickly and accurately evaluate and determine impressions is particularly valuable in the field of forensics. In the forensics field, forensic document examiners can peer into the visible and invisible marks on a document to extract an abundance of details that may verify authenticity or provide additional information crucial to the investigation.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image processing methods and systems.

It is another aspect of the disclosed embodiments to provide for improved methods and systems for scanning and evaluating documents.

If is a further aspect of the disclosed embodiments to provide for methods and systems for extracting impressions (e.g., impression marks, indentations, etc.) and other impression evidence from documents utilizing a mobile device and a mobile application.

The aforementioned aspects and other objectives and advantages can now be achieved as described herein. In an example embodiment, a method and system for extracting impression marks from a substrate (e.g., paper, foil, textile, etc.) can be implemented, which involves, for example, capturing an image of a substrate; detecting from the image physical impressions (e.g., impression marks, indentations, etc.) on the substrate; scanning and highlighting the physical impressions in response to detecting physical impression from the image; and configuring a digital image indicative of the physical impressions. In some example embodiments, the scanning and highlighting of the physical impressions can further involve enhancing the image to digitally and electronically reproduce the physical impressions.

In addition, in some example embodiments, configuring the digital image indicative of the physical impressions can further involve obtaining an output image of differentiated impression pixels utilizing the horizontal edge component and the vertical edge component, wherein the differentiated impression pixels result in the digital image indicative of the physical impressions on the substrate.

In some example embodiments, the aforementioned step or operation of configuring the digital image indicative of the physical impressions can involve splitting the image into a pixel matrix of each individual pixel of the image, convolving the pixel matrix with a vertical kernel to produce a VR (Vertical Resultant) matrix, identifying at least one impression pixel and at least one background pixel in the VR matrix to obtain a vertical edge component, convolving the pixel matrix with a horizontal kernel to produce an HR (Horizontal Resultant) matrix, identifying at least one impression edge component, and obtaining an output image of differentiated impression pixels utilizing the horizontal edge component and the vertical edge component, wherein the differentiated impression pixels result in the digital image indicative of the physical impression on the substrate.

In addition, the aforementioned digital image indicative of the physical impressions can be rendered (e.g., printed) on another substrate (e.g., another sheet of paper), wherein the digital image rendered on the other substrate comprises a processed output image that differentiates the physical impressions in the substrate from a background. In some example embodiments, the aforementioned step or operation for scanning and highlighting the physical impressions can further involve scanning the physical impressions on the substrate with a scanner. Additionally, the image of the substrate can be initially captured with an image-capturing unit (e.g., a digital camera) associated with a computing device (e.g., a smartphone, tablet computing device, laptop computer, etc.).

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 8 illustrates a VK (Vertical Kernel) matrix and an HK (Horizontal Kernel) matrix, in accordance with an example embodiment;

FIG. 9 illustrates a VK matrix after convolution, in accordance with an example embodiment;

DETAILED DESCRIPTION

Figure 1:
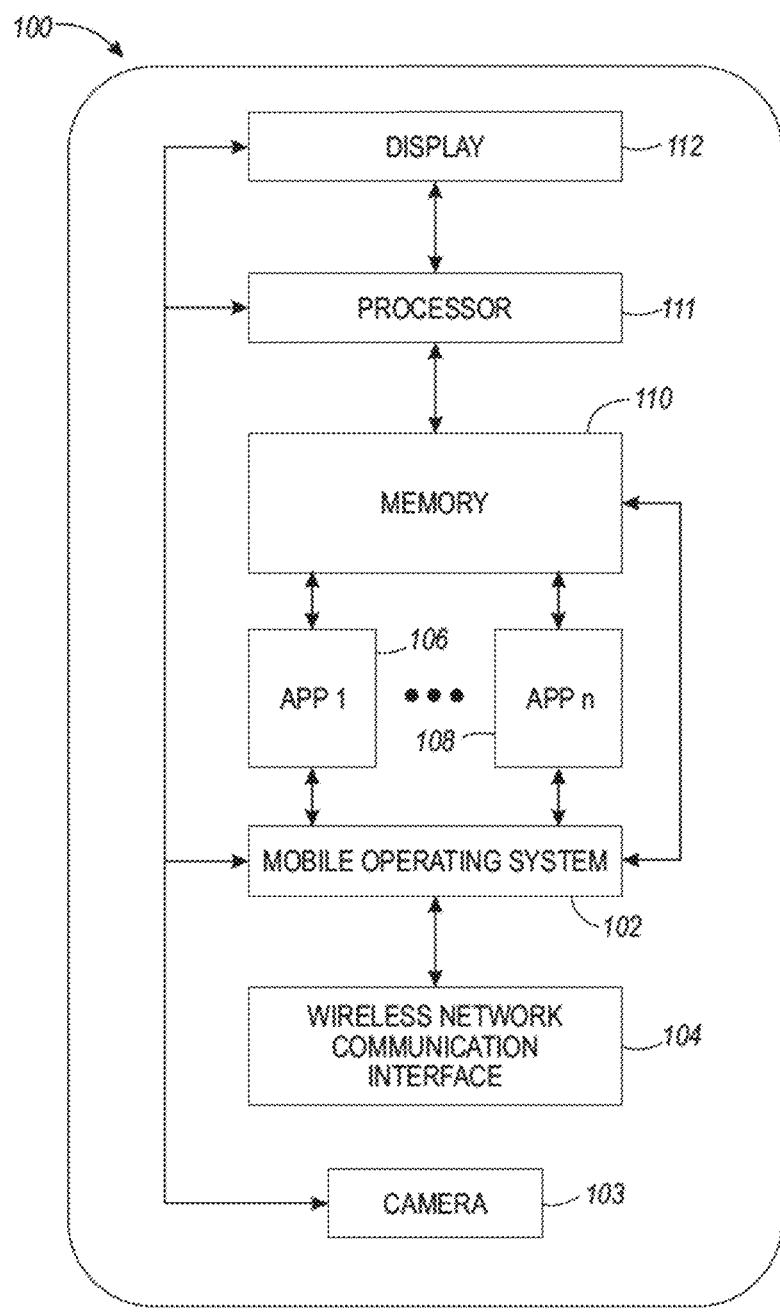
FIG. 1 illustrates a block diagram illustrating an example embodiment of a mobile device, which can be adapted for use in accordance with an embodiment.

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation."

Unless defined otherwise, all technical and scientific terms used herein have the same meanings as commonly understood by one of ordinary skill in the art. As used in this document, the term "comprising" means "including, but not limited to."

A "computing device" or "electronic device" or "data processing system" refers to a device or system that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players, and the like. Various elements of an example of a computing device or processor are described below in reference to FIG. 6.

FIG. 1 illustrates a block diagram depicting an example embodiment of a mobile device 100 that can be utilized in accordance with an example embodiment. The mobile device 100 is an example of a computing device. One or more aspects of the disclosed embodiments can be implemented with or in the context of a computing device such as mobile device 100. In the example shown in FIG. 1, the mobile device 100 (e.g., such as a smartphone, tablet computing device, or other mobile device) generally includes a mobile operating system 102 running on a processor 111 that communicates with a memory 110 and a display 112. Mobile network connectivity is provided via a wireless network communication interface 104, which is configured to transmit and receive information via a wireless radiotelephone subsystem that includes an antenna, transceiver, and associated components to provide wireless communication connectivity via a mobile network to other mobile devices and to networked computers, such as computer servers, via the Internet and/or other networks.

A set of mobile applications (sometimes "mobile app" or "app"), represented in FIG. 1 by mobile apps 106 and 108, are stored on the mobile device 100 on a storage drive or other persistent storage device (not shown) and each is configured to run on top of mobile operating system 102, including by invoking services of mobile operating system 102 to communicate via wireless network communication interface 104 with remote resources, such as application servers running applications and/or services with which the mobile app is associated. Mobile operating system 102 and mobile apps represented by apps 106 and 108 have access to and use a memory 110 to store and retrieve data. For example, mobile operating system 102 may allocate to each app a region of memory to be used by that app to store app-related data. Similarly, each app may be allocated a set of logical locations in a persistent storage managed by mobile operating system 102, e.g., an app-specific directory in a file system used by mobile operating system 102 to manage persistently stored objects.

Mobile operating system 102 is connected to and manages app interactions with a display subsystem 112. Display subsystem 112 (sometimes "display") includes a touch-sensitive display device, for example, a capacitive or other display able to generate and provide to mobile operation system 102 signals representative of single and/or multi-touch gestures, such as swiping (and the direction thereof), pinching in or out, dragging, and dropping. A mobile app such as app 106 or app 108 may be configured to display app display pages, e.g., app user interface pages, content display pages, etc., via display 112. A mobile app also may be configured to receive user input provided via display 112, e.g., selection, dragging, dropping, and/or other user input associated with physical interactions with the touch-sensitive surface of display 112.

A mobile app, such as app 106 or app 108 of FIG. 1, typically provides access to app functionality via a mobile app user interface displayed via a display device of the mobile device. Information and/or user interactive controls may be displayed. Users may access further functionality and/or control the manner in which functionality is provided and/or the content displayed by performing touches and/or gestures (e.g., select an object, activate a button or other control, drag an object to a new location, drag an object to a location associated with a control input—such as dragging a file icon to a folder to add the file to the folder, etc.) Typically, mobile users navigate through successive pages of a mobile app's interface.

Figure 2:
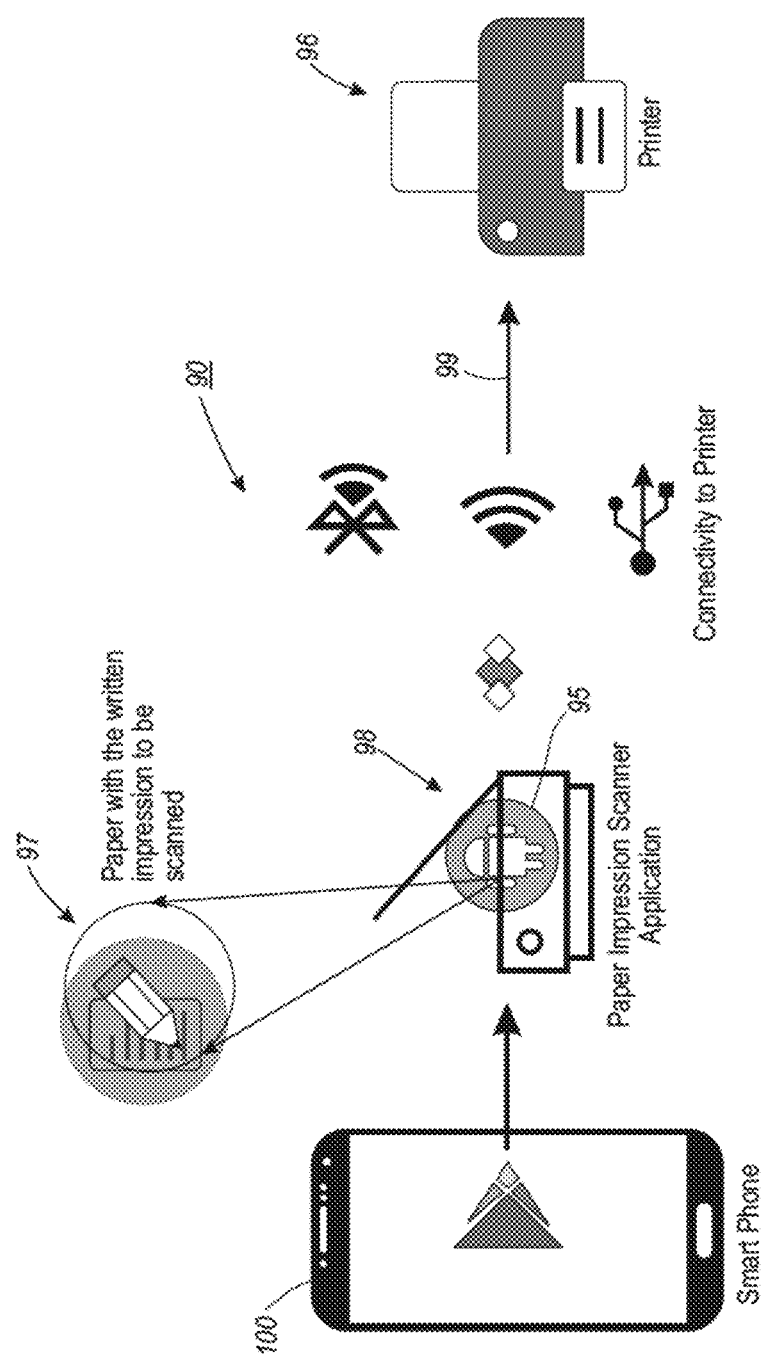
FIG. 2 illustrates a schematic diagram of the workflow of a scanning system that can be implemented in accordance with an example embodiment.

FIG. 2 illustrates a schematic diagram of the workflow of a scanning system 90 that can be implemented in accordance with an example embodiment. The scanning system 90 generally includes a mobile device 100 that communicates with a scanner 98. The mobile device 100 and/or the scanner 98 can communicate as indicated by arrow 99 with a printer 96 via wired or wireless communications (e.g., Bluetooth communications, WiFi Communications, and so on). The mobile device 100 can include a high-resolution digital camera 103.

In general, a substrate such as paper 97 with the written impression to be scanned is shown in FIG. 2 within the bounds of a circle, which represents or indicates that the paper 97 (and the impression or impressions contained on the paper) can be scanned by the scanner 98. The scanning of the paper 97 can be facilitated by a paper impression scanner application or "app" 95. Note that the app 95 can be, for example, an app such as one or more of the apps 106, 108, etc., shown in FIG. 1.

The system 90 addresses the problem of impressions (e.g., impression marks, indentations, etc.) left on substrates such as paper. As indicated previously, whenever someone writes on a paper or a stack of paper, an impression may be left on the next page (page below the page being written on). The subsequent paper may possess a colorless impression that offers valuable information in cases where, for example, the original document is lost or not available when required. With naked eyes, it is difficult to read or discern the content of the substrate or paper containing the colorless impression. This situation, however, can be overcome utilizing the disclosed embodiments such as, for example, the system 90. A mobile app such as the paper impression scanner app 95 can be utilized to scan these written impressions in the paper and extract the original words/text or other symbols, numbers, sketches, etc., written in the original document by highlighting such impressions and finally providing an electronic copy of the output.

Figure 3:
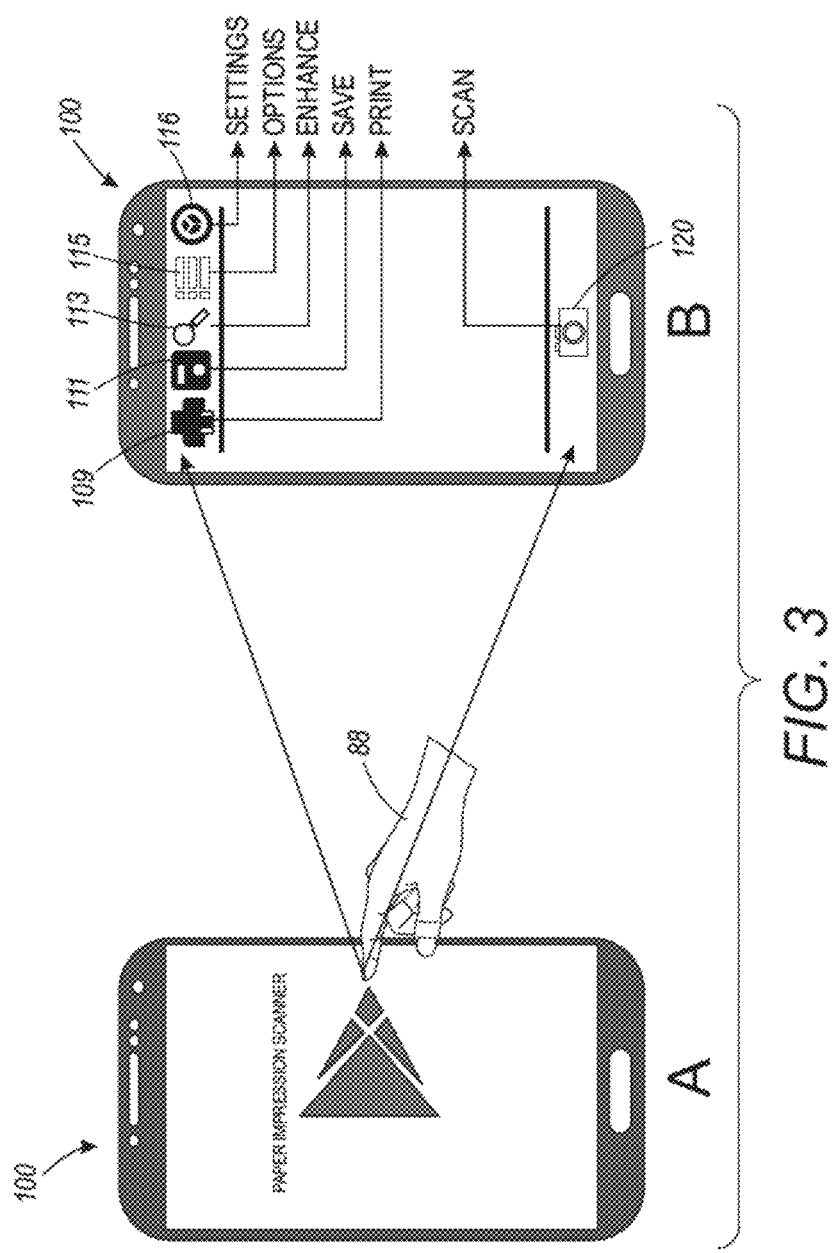
FIG. 3 illustrates a schematic diagram depicting a paper impression scanner application initiation process utilizing a mobile device, in accordance with an example embodiment.

FIG. 3 illustrates a schematic diagram depicting a paper impression scanner application initiation process utilizing the mobile device 100, in accordance with an example embodiment. FIG. 3 generally illustrates a first step of the disclosed scanning process and shows the mobile device at two stages A and B. The first stage A is shown at the left hand side of FIG. 3 and the second stage B is shown at the right hand side of FIG. 3. A user touches a displayed icon associated with a "Paper Impression Scanner" application as indicated by the hand 88 shown in FIG. 3. In other words, the left hand side of FIG. 3 or stage A shows the instance in which a user touches a touchscreen display of the mobile device 100.

When the user touches the screen as shown at the left hand side of FIG. 3, the paper impression scanner application or app 95 is invoked. The application 95 with its various features, settings, and icons is shown at the right hand side of FIG. 3. Various icons of the app 95 are shown on the right hand side of FIG. 3 as displayed via the mobile device 100 in the context of a graphically displayed menu of options (i.e., menu options). For example, a printer icon 109, a save icon 111, a search icon 113, an options icon 115, and a settings icon 116 are shown displayed in a touch screen display area of the mobile device 100.

When a user touches an icon, a particular action is invoked through the app 95. For example, if user touches the print icon 109, a printing operation is invoked. If a user touches the search icon 113, a search or enhancement operation can be invoked, and so on. A camera icon 120 is also shown displayed in the display area of the mobile device 100. Touching the camera icon 120 invokes a scanning operation. Thus, FIG. 3 illustrates how the scanner application 95 can be enabled by a user to explore options such as scan, enhance, save, print, settings, options, and so on. FIG. 3 illustrates a general first step for initiating the disclosed scanning process.

Figure 4:
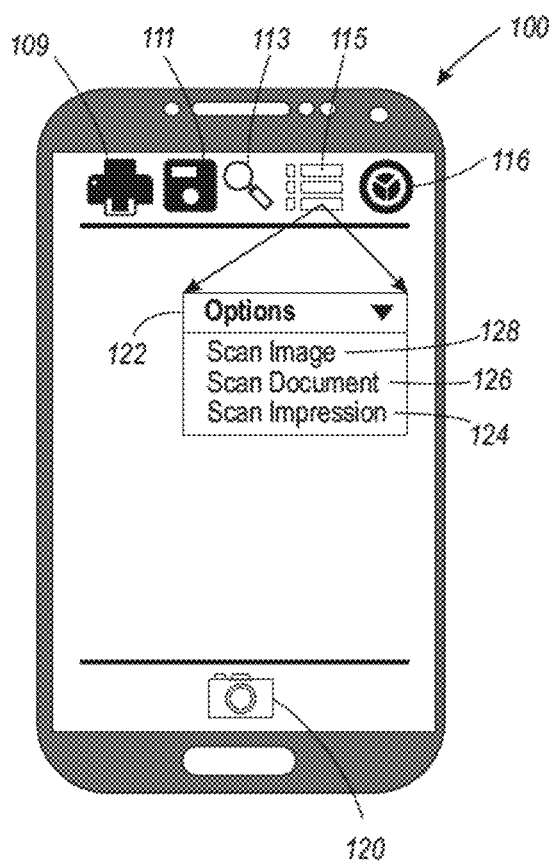
FIG. 4 illustrates a diagram indicating options for enabling scanning impression with a mobile device, in accordance with an example embodiment.

FIG. 4 illustrates a diagram of the mobile device 100 indicating options 122 for enabling scanning of the impression contained on the substrate, in accordance with an example embodiment. FIG. 4 generally illustrates a second step for scanning impressions. A user can invoke various options by touching the options icon 115. Upon touching the options icon 115, various options 122 are presented to the user including scan image 128, scan document 126, and scan impression 124. If a user selects the option for scan impression 124, the application or app 95 initiates the paper impression scanning.

Figure 5:
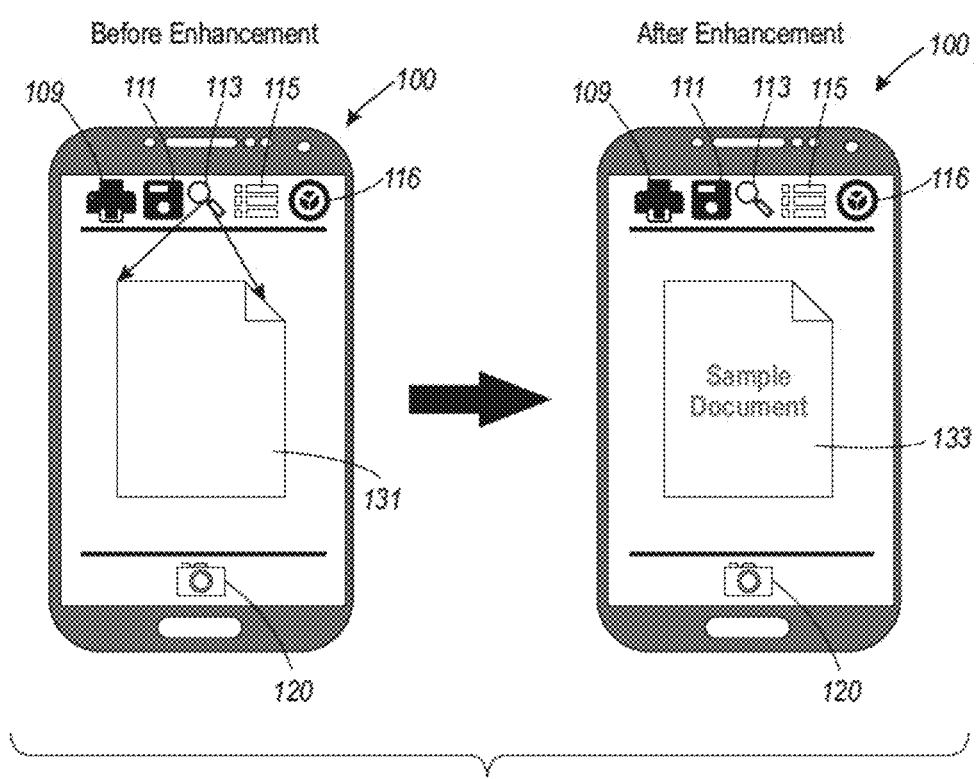
FIG. 5 illustrates a diagram depicting output enhancement via a mobile device, in accordance with an example embodiment.

FIG. 5 illustrates a diagram depicting output enhancement via the mobile device 100, in accordance with an example embodiment. FIG. 5 generally illustrates a third step, which involves scanning the substrate or paper and enhancing the captured of the substrate or paper to reproduce the impressions in the paper. The mobile device 100 is shown "Before Enhancement" with a graphically displayed image 131 of the document (i.e., "sample document") and "After Enhancement" with a graphically displayed image 133 representing the enhanced sample document.

Figure 6:
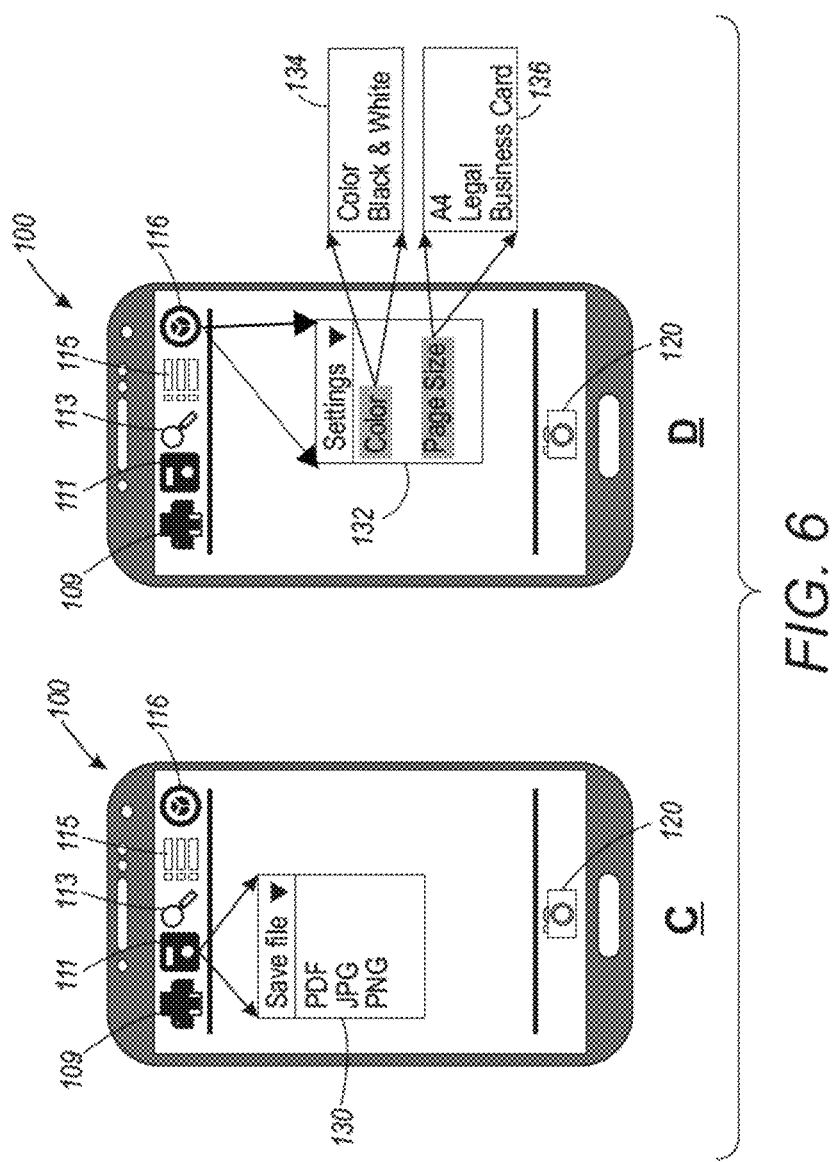
FIG. 6 illustrates a diagram depicting the selection of the output format utilizing a mobile device, in accordance with an example embodiment.

FIG. 6 illustrates a diagram depicting the selection of the output format utilizing a mobile device, in accordance with an example embodiment. FIG. 6 generally illustrates a fourth step, which involves invoking save file options 130 by selecting the disk icon 111. A user can select from among several save file options 130 including saving the image or file in a format such as, but not limited to, .pdf, .jpg, and .png. The save file options 130 are shown on the left hand side of FIG. 6. As shown on the right hand side of FIG. 6, settings options 132 can be invoked by selecting the settings icon 116. Settings include color and page size. Block 134 indicates that color options can include, for example, "color" or "black & white." Block 136 indicates various possible page size options including A4, Legal, and Business Card sizes. The stop shown in FIG. 6 thus involves choosing the output format.

Figure 7:
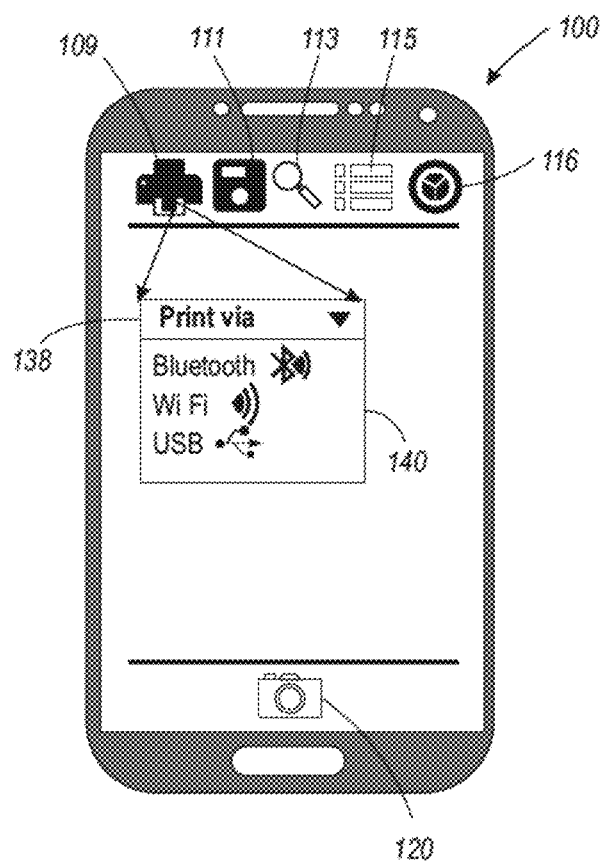
FIG. 7 illustrates a diagram depicting connection options displayed by a mobile device for printing the scanned document, in accordance with an example embodiment.

FIG. 7 illustrates a diagram depicting various connection options facilitated by the mobile device 100 for printing the scanned document, in accordance with an example embodiment. That is, selecting the print icon 109 invokes a print field 138 that provides for printing to a printer over communications connections 140 such as, for example, Bluetooth wireless communications, WiFi or a USB connection.

The following description relates to one possible embodiment of logic for implementing the disclosed approach in the context of a mobile application. The logic utilized can be implemented as follows. First, the given image can be split into a 3×3 matrix (M) of each individual pixel. FIG. 8 illustrates a VK (Vertical Kernel) matrix 182 and =HK (Horizontal Kernel) matrix 184 in accordance with an example embodiment. Next, regarding the VK, to identify impression, the pixel matrix (M) can be convolved with the VK. The Resultant matrix vertical resultant (VR) is a 3×3 matrix. FIG. 9 illustrates an example VK 190 matrix after convolution, in accordance with an example embodiment.

Next, in the VR matrix, if the sum of middle (M)<sum of left (L)+sum of right (R), then that is an impression pixel. If the sum of middle (M)>sum of left (L)+sum of right (R), then that is a background pixel. From the above we can obtain the vertical edge component. The same process can then be implemented with the horizontal kernel in place of the vertical kernel.

Figures 10, 11, 12:
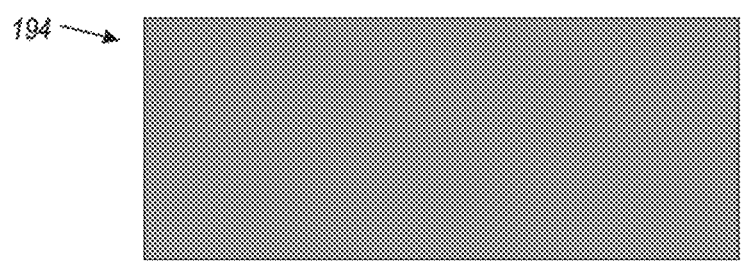
FIG. 10 illustrates an HK matrix after convolution, in accordance with an example embodiment.
FIG. 11 illustrates an input image, in accordance with an example embodiment.
FIG. 12 illustrates an application processed output image, in accordance with an example embodiment.

Regarding the HK to identify the impressions, the pixel matrix (M) is convolved with the Horizontal Kernel (HK). The resultant matrix Horizontal Resultant (HR) is a 3×3 matrix. FIG. 10 illustrates the HK matrix 192 after convolution, in accordance with an example embodiment. In the HR matrix 192, if the sum of middle (M)<sum of top (T)+sum of bottom (B), then that is a background pixel. The horizontal edge component can be obtained from this result. Then, both vertical and horizontal coordinate information will be added to get the original result: Output image=square root of Vertical Square+Horizontal Square or Output Image (OI)=$\sqrt{Vert^2+Horz^2}$. After that, the differentiated impression pixels can be printed to an empty paper.

FIG. 11 illustrates an input image 194 and FIG. 12 illustrates the application processed output image (i.e., the resulting image), in accordance with an example embodiment. The word "TEST" is barely visible in the input image 194. After being processed according to the disclosed embodiments, the resulting output image 196 (based on the processed input image 194) clearly displays the word "TEST".

In general, the substrate (e.g., paper) containing the impression can be placed in a brightly lit place, or if the location is dark, a flashlight available via the mobile device 100 can be utilized to capture the subject substrate properly. The mobile application 95 contained on the mobile device 100 must first be enabled or invoked and then the substrate containing the impression can be scanned with the camera 103 associated with the mobile device 100. After the scan is complete, the application 95 will now process the image and will differentiate the impression in the paper from the background as discussed herein. Based on the matrix calculation, the horizontal edge component and the vertical edge component are calculated, and the following determined: Output image=square root of vertical Square+Horizontal Square or Output Image(OI)=$\sqrt{Vert^2+Horz^2}$.

After this, the differentiated impression pixels will be the required output. The impressions are highlighted using the application 95 and now the actual content of the paper is visible very clearly. As indicated previously, custom settings available in the application 95 and available through the mobile device 100 can help the user to modify the color composition of the scanned image and obtain a better output of the image. The final output can be saved in the desired format (e.g., .pdf, .doc, .jpg, etc.).

Advantages of the disclosed approach include the use of simple procedures for scanning the documents so that anybody who can use a device such as a smartphone can potentially use the disclosed application. In addition, the use of mobile devices such as a smartphone means that the device is useful for obtaining impressions irrespective of the time and location. In addition, "instant" results can be and the output can be improvised in less time. This approach is a cost effective solution because it reduces paper waste. In addition, the disclosed embodiments offer an energy efficient solution, which does not require high-end equipment (e.g., Multi-Functional Printer) to scan documents.

Figure 13:
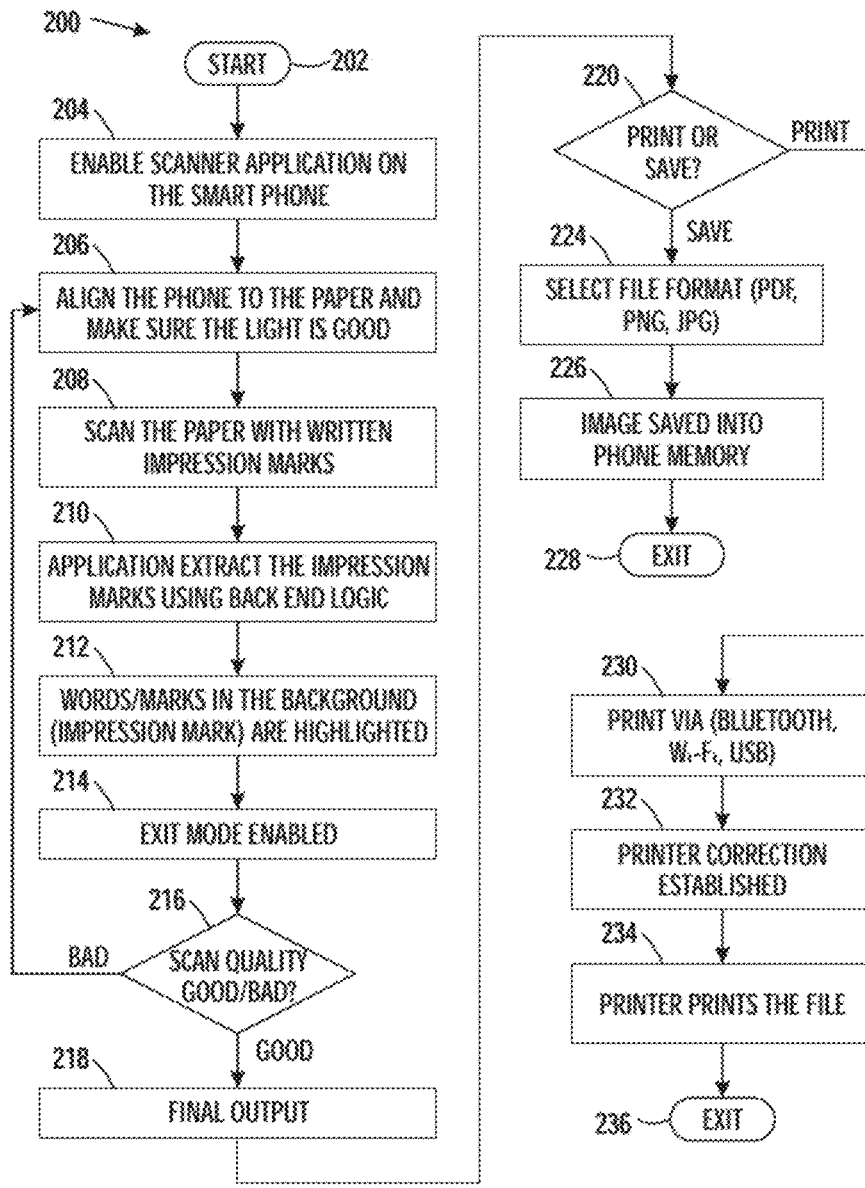
FIG. 13 illustrates a flow chart of operations depicting logical operational steps of a method for extracting and rendering impression marks, in accordance with an example embodiment.

FIG. 13 illustrates a flow chart of operations depicting logical operational steps of a method 200 for extracting and rendering impression marks, in accordance with an example embodiment. As indicated at block 202, the process begins. Then, as shown at block 204, a step or operation can be implemented for enabling the scanner application 95 on the mobile device 100 (e.g., a smartphone, tablet computing device, etc.). Thereafter as shown at block 206, the mobile device 100 can be aligned to the substrate (e.g., paper). It is important that the lighting is sufficient. Thus, the operation at block 206 also involves ensuring sufficient lighting.

Next, as shown at block 208, a step or operation can be implemented for scanning the substrate with its impression marks (i.e., indentations left as a result of writing on a substrate or paper thereon). As depicted next at block 210, a step or operation can be implemented in which the application 95 extracts the impression marks using backend logic. Then, as shown at block 212, a step or operation can be implemented in which words/marks in the background (i.e., impression mark(s)) are highlighted. An edit mode can then be enabled, as shown at block 214.

Thereafter, as depicted at decision block 216, a test can be implemented to determine of if the scan quality was good or bad. If the scan quality is bad, then the operations beginning with those shown at block 206 are repeated. If, however, the scan quality is good, then a final output is generated, as indicated at block 218. Thereafter, as shown at decision block 220, a decision can be made whether or not to print or save the output. If a decision is made to save the output, then as shown at block 224, the output can be saved into a particular file format such as, for example, .pdf, .png, or .jpg, etc. The image(s) can then be saved into a memory location such as memory 110 of the mobile device 100 or another location such as, for example, in a memory of a remote computer server accessible through a data communications network (e.g., the Internet, cellular communications network, wireless/WLAN network, and so on). The process can then end, as shown at block 228.

If it is determined, however, after processing of the operation shown at decision block 220 to print the output (i.e., the output image), then as indicated at block 230, printing communications through, for example, Bluetooth communications, WiFi, USB, etc., can be initiated. A printer connection is established as shown at block 232 following by actual printing or rendering of the output image (e.g., such as the image 196 shown in FIG. 12) via a printer in communications with the mobile device 100. The process then ends, as shown at block 236.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The disclosed example embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
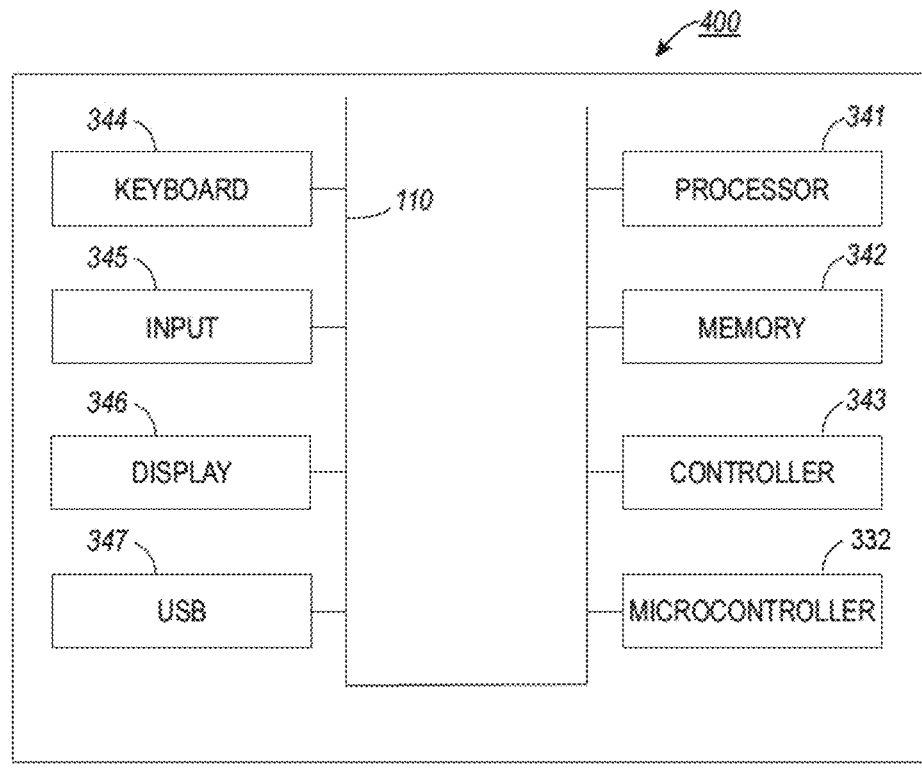
FIG. 14 illustrates a schematic view of a computer system, in accordance with an embodiment.
Figure 15:
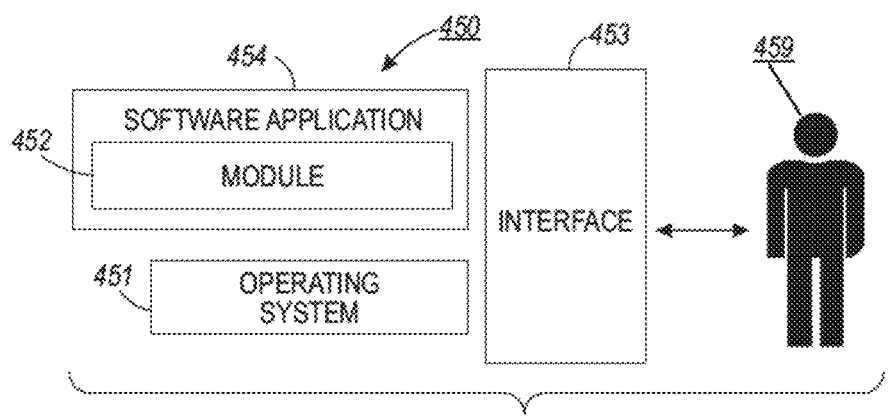
FIG. 15 illustrates a schematic view of a software system including a module, an operating system, and a user interface, in accordance with an embodiment.

FIGS. 14-15 are shown only as exemplary diagrams of data-processing environments in which example embodiments may be implemented. It should be appreciated that FIGS. 14-15 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 14, some embodiments may be implemented in the context of a data-processing system 400 that can include, for example, one or more processors such as a processor 341 (e.g., a CPU (Central Processing Unit) and/or other microprocessors), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a smartphone, a pad computing device, and so on, wherein each such device is operably connected to and/or in communication with a client-server based network or other types of networks (e.g., cellular networks, Wi-Fi, etc.).

FIG. 15 illustrates a computer software system 450 for directing the operation of the data-processing system 400 depicted in FIG. 14. Software application 454 stored, for example, in memory 342 or another memory such as memory 110 of the mobile device 100 shown in FIG. 1, generally includes one or more modules such as module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions or operations such as those discussed herein. Module 452 may also be composed of a group of modules.

The following discussion is intended to provide a brief, general description of suitable computing environments in which the system and method may be implemented. Although not required, the disclosed embodiments will be described in the general context of computer-executable instructions, such as program modules being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 14-15 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of example embodiments are disclosed herein. For example, in one embodiment, a method for extracting impression marks from a substrate can be implemented. Such a method can include steps or operations (e.g., instructions) such as capturing an image of a substrate; detecting from the image physical impressions on the substrate; scanning and highlighting the physical impressions in response to detecting physical impressions from the image; and configuring a digital image indicative of the physical impressions. In some example embodiments, the step or operation of scanning and highlighting the physical impression can further include a step or operation of enhancing the image to digitally and electronically reproduce the physical impressions.

In another example embodiment, the step or operation of configuring the digital image indicative of the physical impressions can further comprise a step or operation for obtaining an output image of differentiated impression pixels utilizing the horizontal edge component and the vertical edge component, wherein the differentiated impression pixels result in the digital image indicative of the physical impressions on the substrate. In some example embodiments, the aforementioned substrate may be paper or another type of substrate.

In another example embodiment, the step or operation of configuring the digital image indicative of the physical impressions can further include steps or operations for splitting the image into a pixel matrix of each individual pixel of the image; convoluting the pixel matrix with a vertical kernel to produce a VR (Vertical Resultant) matrix; identifying at least one impression pixel and at least one background pixel in the VR matrix to obtain a vertical edge component; convoluting the pixel matrix with a horizontal kernel to produce an HR (Horizontal Resultant) matrix; identifying at least one impression pixel and at least one background pixel in the HR matrix to obtain a horizontal edge component; and obtaining an output image of differentiated impression pixels utilizing the horizontal edge component and the vertical edge component, wherein the differentiated impression pixels result in the digital image indicative of the physical impressions on the substrate.

In still another example embodiment, a step or operation can be provided for rendering the digital image indicative of the physical impressions on another substrate wherein the digital image rendered on the another substrate comprises a processed output image that differentiates the physical impressions in the substrate from a background. In yet another example embodiment, the step or operation of scanning and highlighting the physical impressions can further include a step or operation scanning the physical impressions on the substrate with a scanner.

Note that in some example embodiments, the image of the substrate can be captured with an image-capturing unit associated with a computing device. In yet another example embodiment, the step or operation of configuring the digital image indicative of the physical impressions can further involve a step or operation of configuring the digital image indicative of the physical impressions in response to the scanning and highlighting of the physical impression.

In another example embodiment, a system for extracting impression marks from a substrate can be implemented. Such a system can include, for example, one or more processors and a non-transitory computer-usable medium embodying computer program code, the computer-usable medium capable of communicating with the one or more processors. The computer program code includes instructions executable by the one or more processors and configured for; capturing an image of a substrate; detecting from the image physical impressions on the substrate; scanning and highlighting the physical impressions in response to detecting physical impressions from the image; and configuring a digital image indicative of the physical impressions.

In still another example embodiment, an apparatus for extracting impression marks from a substrate can be implemented. Such an apparatus can include, for example, an image capturing device for capturing an image of a substrate; and a detector for detecting from the image physical impressions on the substrate, wherein the physical impressions are scanned and highlighted in response to detecting physical impressions from the image, and wherein a digital image is configured indicative of the physical impressions based on the physical impressions that were scanned and highlighted.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for extracting marks physically formed on a substrate, comprising:
    capturing an image of the substrate;
    detecting from said captured image physical impressions formed on said substrate; and
    highlighting said physical impressions; and
    configuring a digital image indicative of said physical impressions by splitting said captured image into a pixel matrix of each individual pixel of said captured image, convolving said pixel matrix with a vertical kernel to produce a VR (Vertical Resultant) matrix, identifying at least one impression pixel and at least one background pixel in said VR matrix to obtain a vertical edge component, convolving said pixel matrix with a horizontal kernel to produce an HR (Horizontal Resultant) matrix, identifying at least one impression pixel and at least one background pixel in said HR matrix to obtain a horizontal edge component, and obtaining an output image of differentiated impression pixels utilizing said horizontal edge component and said vertical edge component, wherein said differentiated impression pixels result in said digital image indicative of said impression marks physically formed on said substrate.

2. The method of claim 1, wherein said highlighting said physical impressions further comprises; digitally and electronically reproducing said physical impressions.

3. The apparatus of claim 1, wherein said substrate comprises paper.

4. The method of claim 1, further comprising rendering said digital image indicative of said physical impressions on another substrate wherein said digital image rendered on said another substrate comprises a processed output image that differentiates said physical impressions on said substrate from a background.

5. The method of claim 1, wherein said capturing an image including said physical impressions, further comprises: scanning said physical impressions on said substrates with a scanner.

6. The method of claim 1, wherein said captured image of said substrate is captured with an image-capturing unit associated with a computing device.

7. The method of claim 1, wherein said configuring said digital image indicative of said physical impressions, further comprises:
    configuring said digital image indicative of said physical impressions in response to highlighting said physical impression.

8. A system for extracting impression marks physically formed on a substrate from the substrate, said system comprising:
    at least one processor; and
    a non-transitory computer-usable medium embodying computer program code, said computer-usable medium capable of communicating with said at least one processor, said computer program code comprising instructions executable by said at least one processor and configured for:
        capturing an image of the substrate including impression marks physically formed on said substrate;
        detecting from said captured image said impression marks formed on said substrate;
        highlighting said impression marks in response to detecting said impression marks from said captured image;
        configuring a digital image indicative of said impression marks by splitting said captured image into a pixel matrix of each individual pixel of said captured image, convolving said pixel matrix with a vertical kernel to produce a VR (Vertical Resultant) matrix, identifying at least one impression pixel and at least one background pixel in said VR matrix to obtain a vertical edge component, convolving said pixel matrix with a horizontal kernel to produce a HR (Horizontal Resultant) matrix, identifying at least one impression pixel and at least one background pixel in said HR matrix to obtain a horizontal edge component, and obtaining an output image of differentiated impression pixels utilizing said horizontal edge component and said vertical edge component, wherein said differentiated impression pixels result in said digital image indicative of said impression marks physically formed on said substrate.

9. The system of claim 8, wherein said instructions for highlighting said impression marks, further comprises instructions configured for: enhancing said captured image to digitally and electronically reproduce said impression marks.

10. The system of claim 8, wherein said substrate comprises paper.

11. The system of claim 8, further comprising instructions configured for rendering said digital image indicative of said impression marks on another substrate wherein said digital image rendered on said another substrate comprises a processed output image that differentiates said impression marks in said substrate from a background.

12. The system of claim 8, wherein said instructions for highlighting said impression marks, further comprises instructions configured for scanning said impression marks on said substrate with a scanner.

13. The system of claim 8, wherein said captured image of said substrate is captured with an image-capturing unit associated with a computing device.

14. The system of claim 8, wherein said instructions for configuring said digital image indicative of said impression marks, further comprises instructions configured for:
configuring said a colored digital image indicative of said impression marks in response to highlighting said impression marks.

15. An apparatus for extracting colorless impression marks physically formed on a substrate, said apparatus comprising:
an image capturing device for capturing an image of the substrate; and
a processor including a detector for detecting from said captured image colorless impression marks physically formed on said substrate, wherein said colorless impression marks are highlighted by the processor in response to detecting colorless impression marks from said captured image, and wherein a digital image is configured indicative of said colorless impression marks, based on said colorless impression marks that were highlighted, by splitting said captured image into a pixel matrix of each individual pixel of said captured image, convolving said pixel matrix with a vertical kernel to produce a VR (Vertical Resultant) matrix, identifying at least one impression pixel and at least one background pixel in said VR matrix to obtain a vertical edge component, convolving said pixel matrix with a horizontal kernel to produce a HR (Horizontal Resultant) matrix, identifying at least one impression pixel and at least one background pixel in said HR matrix to obtain a horizontal edge component, and obtaining an output image of differentiated impression pixels utilizing said horizontal edge component and said vertical edge component, wherein said differentiated impression pixels result in said digital image indicative of said impression marks physically formed on said substrate.

16. The apparatus of claim 15, wherein said substrate comprises paper.

* * * * *